United States Patent [19] [11] 3,759,379
Wrede [45] Sept. 18, 1973

[54] FLEXIBLE HALOGEN PACKAGE
[75] Inventor: Leroy E. Wrede, Lombard, Ill.
[73] Assignee: Packaging Laminators, Inc., Bensenville, Ill.
[22] Filed: Feb. 24, 1972
[21] Appl. No.: 229,010

Related U.S. Application Data
[63] Continuation-in-part of Ser. No. 36,142, May 11, 1970, abandoned.

[52] U.S. Cl................... 206/84, 128/272, 161/147, 161/216, 161/231, 161/254
[51] Int. Cl............................................ B65d 81/00
[58] Field of Search................... 161/147, 165, 190, 161/231, 216, 252, 254, 256, 413; 156/244, 231; 206/56 AA, 84; 128/272

[56] References Cited
UNITED STATES PATENTS
3,712,848  1/1973  Casey Jr. et al................... 161/216
3,556,816  1/1971  Nughes.............................. 161/254

Primary Examiner—George F. Lesmes
Assistant Examiner—P. Thibodeau
Attorney—Benjamin H. Sherman et al.

[57] ABSTRACT

A flexible package of halogen solutions, such as alcohol or water based tinctures of iodine. In certain embodiments, the package is formed of a laminate comprising an inner layer of cast polyvinylchloride, a layer of adhesive, a layer of vinylidene chloride copolymer on the adhesive and an outer layer of polyethylene terephthalate. In other embodiments, a thin aluminum foil coated with paper or cellophane is adhered on to the terephthalate film so as to form the outer layer of such a laminate.

10 Claims, 4 Drawing Figures

PATENTED SEP 18 1973 3,759,379
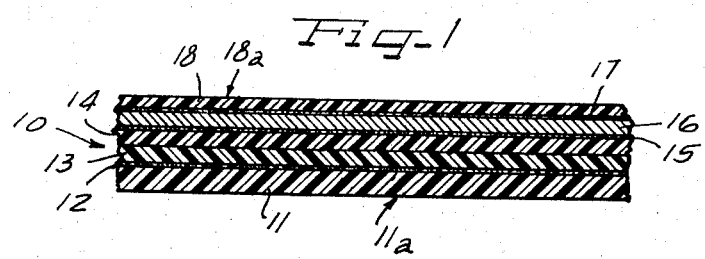
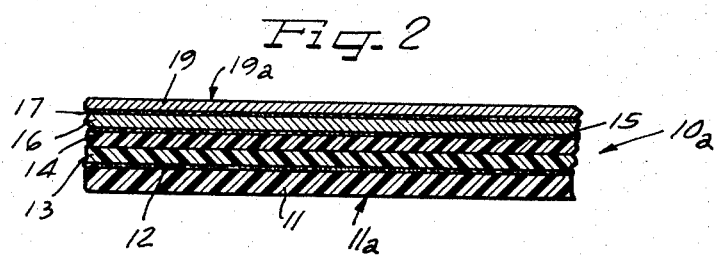
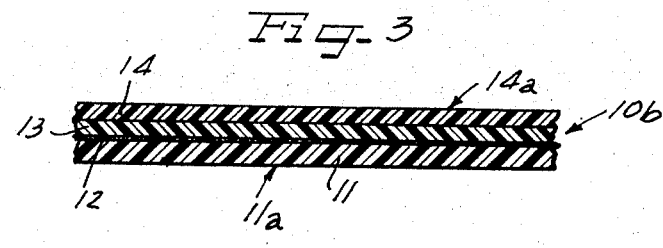
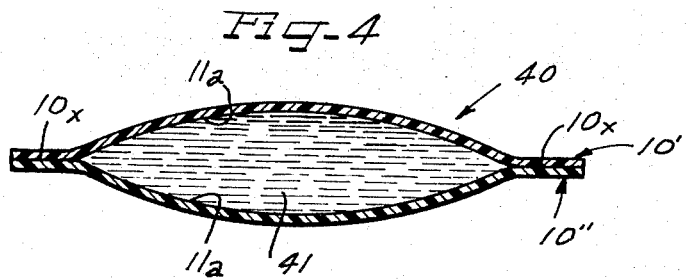

FLEXIBLE HALOGEN PACKAGE

CROSS-REFERENCED TO RELATED APPLICATION

This is a continuation-in-part of now abandoned U. S. Ser. No. 36,142 filed May 11, 1970 which is incorporated herein by reference.

BACKGROUND OF THE INVENTION

1. Field of the Invention

The invention relates to flexible packages and more particularly to vapor and halogen impermeable flexible packages.

2. Description of the Prior Art

Halogen materials (solutions or solids) are highly corrosive to a wide variety of organic materials and are generally stored in inorganic packages, such as composed of glass. Nevertheless, halogen materials have a number of highly desirable and important characteristics including germicidal and antiseptic properties as well as biological, biochemical and othe uses as research materials so that it would be desirable to make them readily and economically available, as in flexible packages suitable for enclosing single unit volumes or the like. Present day packages for halogens have a number of drawbacks, including breakage, lack of flexibility, cost, etc. Further, heretofore knwon packages for halogens, especially liquid compositions thereof, do not lend themselves to simple sealing techniques or to packages suitable for the enclosure of small individual amounts of a particular halogen composition. Additionally, some of the known packages for halogens are vapor permeable so that upon storage of a halogen composition in such a package, the halogen composition changes over a prolonged period of storage.

SUMMARY OF THE INVENTION

The invention provides a flexible package that overcomes the aforesaid drawbacks, is economical in cost, is vapor and halogen impervious, is easily sealable and is readily adaptable for the enclosure of small individual quantities of a desired halogen composition.

Accordingly, it is an important object of the present invention to provide a heat-sealable flexible package for halogen solutions, such as alcohol or water based tinctures of iodine.

Another object of the invention is to provide a flexible package for halogen solutions composed of an inner layer of cast polyvinylchloride material, an adhered layer of vinylidene chloride copolymer material and an outer layer of polyester (polyethylene terephthalate) material arranged so that in the formed package an inner layer of polyvinylchloride material forms the inner surface of the package and acts as a sealant.

Yet another object of the invention is to provide a flexible package for halogen solutions formed of a laminate comprising an inner layer of cast polyvinylchloride material, a layer of adhesive, a layer of vinylidene chloride copolymer material on the adhesive, a layer of polyethylene terephthalate material on the vinylidene chloride copolymer material, a layer of adhesive on the terephthalate material, a thin aluminum foil on the adhesive, a layer of adhesive on the foil and a layer of paper or cellophane on the adhesive to form an outer surface, the laminate being arranged so that the polyvinylchloride layer forms an inner surface of the package and the sealant therefor.

Many other advantages, features and additional object of the present invention will become manifest to those versed in the art upon making reference to the detailed description of certain preferred embodiments thereof, taken in conjunction with the accompanying sheet of drawings in which preferred structural embodiments incorporating the principles of the invention are shown by way of illustrative examples only.

BRIEF DESCRIPTION OF THE DRAWINGS

An understanding of further particulars of the invention may be obtained from a consideration of the following detailed descriptions of representative embodiments thereof, taken in conjunction with the accompanying figures in the drawings, of which:

FIG. 1 is an enlarged elevational view of a portion of one embodiment of packaging material used in forming the packages of the invention;

FIG. 2 is an enlarged elevational view of a portion of another packaging material used in forming the packages of the invention;

FIG. 3 is an enlarged elevational view of a portion of yet another packaging material used in the forming of the packages of the invention; and FIG. 4 is an enlarged schematic elevational view of a package embodying the instant invention.

DESCRIPTION OF THE PREFERRED EMBODIMENTS

The principles of the invention are particularly useful when embodied with packaging materials, such as shown at FIGS. 1 through 3, formed into desired sized and shaped flexible packages, such as shown at FIG. 4.

The flexible packages of the invention are at least substantially water vapor and alcohol vapor impermeable, as well as being resistant over prolonged storage periods under varying temperature and humidity conditions to halogen attack and particularly to iodine attack. The laminated construction of the packaging material forming the packages of the invention provide extremely desirable characteristics, including exceptional vapor barrier properties, inertness to halogen solutions, non-absorption of solvents, durable handleability, relatively easy sealability, adaptability to various packaging forms, etc.

As shown at FIG. 1, packages of the invention are formed of flexible packaging material, an embodiment at 10 being illustrated. The packaging material 10 is comprised of a plurality of layers so as to form a lamina construction. The bottom or inner layer 11 is composed of a cast polyvinylchloride resin material. Films formed of polyvinylchloride resin material are readily heat sealable to themselves by heat and pressure techniques so as to function as the sealant material for the packages of the invention. Further, polyvinylchloride resin films are extremely resistant to halogen attack, particularly iodine attack. Nevertheless, polyvinylchloride films do not have handling characteristics sufficient for it to be utilized as a packaging material per se.

Polyvinylchloride resin film materials are relatively well known and may be produced by casing, extrusion or calendering. The cast (solvent) type polyvinylchloride films are preferred since they exhibit extremely good physical characteristics, including chemical inertness, resistance to vapor, etc. Generally, polyvinylchloride films are formed from vinyl chloride resin polymers (i.e., polyvinylchloride) which are polymerized in a solvent medium from vinyl chloride monomers (which are sometimes formed from ethylene and chloride) in the presence of a catalyst and under heat and pressure conditions. Dispersions of very fine emulsions of vinyl chloride resin materials are homogeneously intermixed in a plasticizer containing generally less than 10 percent solvents and diluents, and cast from suitable molds, with the application of heat, to form a continuous tube or the like, which is then conventionally processed into a desired size film having a thickness ranging from below about 1 mil to about 10 mils.

A compatible adhesive or primer layer 12 is applied along one surface of the layer 11 to provide an anchoring means for adhering other film material onto layer 11 to form a composite laminat packaging material. The adhesive or primer may be of any compatible type and is preferably a polyurethane adhesive such as an adhesive material commercially available under the trademark "UNOFLEX" (a registered trademark of Polymer Industries, Inc. for polyurethane adhesives utilizing toluol solvents); or other compatible adhesives, such as "Polyester # 503" (a trade designation of the Morton Chemical Co. for a poyester adhesive material), etc. The adhesive or primer material is applied as a semi-liquid or viscous material through various conventional techniques, such as conventional mill rolling, reverse rolling, roto gravure techniques, etc., in a predetermined thickness ranging from about 0.0001 to 0.0005 inches (i.e., 0.1 to 0.5 mils).

A layer 13 composed of vinyl idene chloride copolymer resin (i.e. saran) is laminated onto the exposed adhesive layer 12 to provide improved vapor barrier characteristics to the packaging material. The layer 13 is preferably applied in thicknesses ranging from about 0.0001 to 0.00001 inch (i.e., 0.1 to 0.01 mils).

Thereafter, a layer 14 of polyester (polyethylene terephthalate) material is adhered to the exposed surface of layer 13 to provide handling characteristics. Various polyester film materials are suitable, such as for example "MYLAR" (a registered trademark of E.I. du Pont de Nemours & Co., Inc. for a polyester film based on ethylene glycol and dimethyl terephthalate), "SCOTCHPAR" (a registered trademark of the 3M Co. for a polyester film based on ethylene glycol and terephthalic acid); "CELANAR" (a registered trademark of Celanese Plastics Co. for a polyester film based on polyethylene terephthalate), etc. Such polyester films exhibit excellent handling characteristics, including toughness, folding endurance, very low moisture absorption, flexibility over a wide range of temperatures, low vapor transmission rates, long shelf life, etc. ad are available in thickness ranging from about 0.00015 to 0.015 inches (i.e., 0.15 to 15 mils).

A compatible adhesive or primer layer 15 is applied along the exposed surface of layer 14. The adhesive material may be similar to the composition of layer 12 and is applied in similar thicknesses.

A thin aluminum foil 16 is adhered to the exposed surface of adhesive layer 15. Aluminum foil is available in various thicknesses ranging from about 0.006 to about 0.00025 inches. Aluminum foil provides excellent water-vapor barrier characteristics and is preferably utilized in packages for water-based halogen solutions. A compatible adhesive or primer layer 17 is applied along the exposed surface of the aluminum foil layer 16. The adhesive may be similar to that described earlier or may be of another type, such as a casien latex applied in a relatively thin layer.

A top of outer layer 18 is applied onto the exposed adhesive layer 17 to eliminate any pinholes or the like that may be present in the relatively thin aluminum layer 16. The top layer 18 is composed of cellophane, such as a nitrocellulose coated cellophane, a polyvinllidene chloride coated cellophane, a vinyl copolymer coated cellophane, a polyethylene coated cellophane, etc. In addition, to provide a desired protection to the thin aluminum coatings, the cellophane layer 18 provides a top surface 18a exceptionally suited for printing of desired indicia on the formed package.

The packaging material embodiment 10a illustrated FIG. 2 is substantially identical to the packaging material 10 hereinabove discussed and similar reference numerals refer to similar layers and similar materials. A notable difference is that packaging material 10a has a top layer 19 composed of paper or other fibrous materials. Paper layer 19 functions as a protective layer to the underlying aluminum layer 16 and provides a top surface 19a which is readily printed with desired indicia.

The packaging materials 10 and 10a are particularly well suited for packaging water-based halogen compositions since they are particularly resistant to water vapor transmissions.

FIG. 3 illustrates an embodiment of packaging material 10b which is exceptionally suited for formation of packages that are intended to contain alcohol-based halogen solutions. The packaging material 10b is comprised of a bottom layer 11 of cast polyvinylchloride film, a face 11a thereof forming the inner face of the package in contact with the halogen solution, a layer 12 of primer, a layer 13 of saran film and a top or upper layer 14 of polyester (polyethylene terephthalate film). The various layers are strongly adhered to one another and form a unitary packaging material. The exposed or free surface 14a of layer 14 may be provided with indicia such as advertisements, description of the contents within the package, etc.

The aforesaid packaging material may also be formed by coextrusion methods, for example by simultaneous extrustion of polyethylene terephthalate resin and vinylidene chloride copolymer resin to form two separate moltened melt streams which are joined together, as by the use of pressure so as to form a unitary structure composed of the two resin materials. Similarly, the aluminum foil may be coated on one or both sides by coextrusion methods, wherein for example, cellophane and polyester resins are extruded along opposite sides of the aluminum foil and pressure bonded thereto to form a unitary structure. Of course, such a partial packaging material structure may then be passed to another extrusion station whereby a further material, such as saran, is coated on a desired surface, as onto the polyester surface. Accordingly, the primer or adhesive layers 12, 14 and 17 may be dispensed with in at least certain embodiments.

In preferred embodiments, the layer 11 is composed of cast polyvinylchloride film, such as available under the mark "RCL FILM", (a trade name of the Goodyear Tire & Rubber Co. for a cast polyvinyl chloride resin material) and has a preferred thickness of about 0.002 inch (i.e., 2 mils). The polyester film layer 14 preferably is provided in a thickness ranging from about 0.0005 to 0.0001 inch (i.e., 0.5 to 0.01 mils) and is coated with a layer 13 of vinylidene chloride copolymer material in a conventional extrusion process. The vinylidene chloride copolymer layer 13 is applied so as to have thickness in a range of about 0.001 to 0.00001 inch (i.e., 0.1 to 0.01 mils). This composite polyester-vinylidene chloride copolymer film may be suitably wound into supply rolls for use at subsequent work stations. In instances where a primer is utilized between layers 11 and 13, it has been found advantageous to coat the surface of layer 11, such as by conventional mill-rolling apparatus with a suitable primer, such as the aforementioned "UNOFLEX" (with or without solids and/or activators). The primer is applied in a precalculated thickness ranging from about 0.0001 to 0.0005 inch (i.e., 0.1 to 0.5 mils). The primer may be passed through an oven to remove volatile solvents, etc. and to render the primer more tacky. The composite structure of layers 11 and 12 is then passed to an laminating station so that layer 12 comprises the exposed surface of the preformed composite of layers of 13 and 14 is passed to the same laminating station so that layer 13 comprises the exposed surface and the two composites are brought together so that lyaer 13 adheres to layer 12 in a unitary lamina form. In embodiments wherein a protected aluminum foil is utilized, suitably coated aluminum foils are prepared or obtained from the market, and laminated to the exposed surface of layer 14 to form the packaging material such as illustrated in FIGS. 1 and 2. This type of forming technique is relatively conventional in lamina manufacture so that additional details thereof are not necessary.

FIG. 4 illustrates a package embodiment 40 comprising an exemplary form of a package form of the invention as formed from the pack-materials described in conjunction with FIGS. 1–3. The package 40 contains a halogen containing solution 41, such as an alcohol or water based tincture of iodine. The package 40 is formed of any desired size, including relatively small unit size for individual small amounts. As shown, one packaging material 10' is composed of a plurality of lamina structures such as discussed in regard to FIGS. 1–3, and has an inner surface 11a composed of cast polyvinylchloride film material. The other film package material 10'' is similarly composed of the packaging material discussed hereinabove and has an inner surface 11a composed of polyvinylchloride resin material. The two packaging materials 10' and 10'' are heat-sealed along the peripheral edges 10x so that contiguous contact between face surfaces of the polyvinylchloride film layers is achieved in a conventional manner, as by the application of heat and pressure to form a generally fluid-impervious seal. Generally, temperatures in the range of about 250° to 400° F. with the application of pressure ranging from about 25 to 75 psi are suitable. Of course, prior to ultimate sealing of a package, it is filled with the desired halogen solution, i.e., a tincture of iodine solution of a known concentration and thereafter the package is sealed. The formed package is then suitable for handing and storage as desired, has excellent handling characteristics and will provide protection for the enclosed solution from ambient environment over relatively long periods of time and under diverse ambient conditions. This type of package is readily openable by an end user and, because of its economy, is readily disposable.

In order to demonstrate the excellent characteristics of the inventive package, the following demonstrations are set forth.

A number of packages, substantially as illustrated in FIG. 4, were formed of a packaging material comprised of an inner or bottom layer of "RCL FILM" in a thickness of about 2 mils, a layer of primer "UNOFLEX" in a thickness of about 0.1 mils and an upper or top layer of "MYLAR" coated on one side thereof with saran. The top layer was positioned so that the uncoated side of the "MYLAR" film was in contact with ambient environment and the saran coating was in contact with the primer. The structure of this packaging material was substantially identical to that illustrated at FIG. 3. The "MYLAR" film had a thickness of about 0.5 mils and the saran coating had a thickness of about 0.1 mils.

A portion of this all plastic packaging material was formed into suitable packages and filled with 10 cc of a 5% polyvidone (polyvinylpyrrolidone) iodine solution, heat-sealed and placed in an oven maintained at about 140° F. After a 24-hour period, no leaks were noted in any of such packages, and there was substantially no weight loss.

Identical packages were also filled with 10 cc of a tincture of iodine in a 44 to 48 percent alcohol solution (available under the brand name "Swan") and likewise placed in the heated oven for the same period of time. No leaks were noted at the end of the 24-hour period, although very minor weight losses were noted in some of the packages.

The all-plastic package material above described was then laminated with a cellophane-coated aluminum foil (0.5 mils). The resultant flexible packaging material was substantially identical to that illustrated at FIG. 1. This packaging material was then formed into suitable packages that were filled with 10 cc of a tincture of iodine in a 44 to 48 percent alcohol solution ("Swan") and heat-sealed. The sealed packages were placed in an oven heated at about 140° F and allowed to remain in the heated oven for 24 hours. At the end of the period, no leaks were noted and there was absolutely no weight loss in any of the packages.

Similarly, identical packages were filled with the above iodine alcohol solution and was stored in an ambient environment, i.e., room conditions, for a three-week period, with no leaks or any substantial weight loss noted throughout the storage period.

In summation, it will be seen that the invention achieves its object and provides a novel flexible package for halogen solutions, such as alcohol or water based tinctures of iodine that is a flexible generally flui-dimpervious enclosure for retaining such halogen solutions therein and protecting the same from ambient environment without interacting with such solutions. The enclosure includes a relatively thin flexible and heat-sealable sheet material comprised of a plurality of lamina adhered to each other along contiguous surfaces thereof. In one embodiment, the top layer of such a lamina is formed of polyethylene terephthalate resin material to provide structual strength to the package, an intermediate layer of vinylidene chloride copolymer to provide improved vapor impermeability characteristics to said package, a compatible adhesive or primer to provide adherence between the plurality of lamina and a bottom layer of cast polyvinylchloride resin to provide chemical inertness and heat-sealing characteristics to the package. In another embodiment, the sheet material is comprised of a plurality of lamina substantially similar to that described hereinabove and overcoated with a relatively thin laumimum foil protected from ambient conditions by a layer of cellophane of paper. Yet in other embodiments, the sheet material is identical to one of the other of the embodiments above described, but without an adhesive or primer layer.

As is apparent from the foregoing specification, the present invention is susceptible to being embodied with various alterations and modifications which may differ particularly from those that they have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

I claim as my invention:

1. A packaging consisting essentially of, in combination, a halogen solution and a flexible generally fluid-impervious enclosure for retaining said solution and protecting the same from ambient environment, said enclosure being comprised of a relatively thin flexible and heat-sealable sheet, said sheet comprising a plurality of lamina adhered to each other along configuous surfaces thereof, a first lamina being formed of a polyethylene terephthalate resin to provide structural strength to said packaging, a second lamina strongly adhered to said first lamina and being formed of a vinylidene chloride copolymer resin to provide vapor-impereability to said packaging, and a third lamina strong adhered to said second lamina and being formed of a cast polyvinylchloride resin to provide chemical inertness and heat-sealability to said packaging, said enclosure surrounding said solution so that only a face portion of said third lamina contacts said solution and so that peripheral edge portions of said third lamina are heat-sealed to one another to form a generally fluid-impervious seal.

2. A packaging as defined in claim 1 wherein the halogen solution comprises a water-base tincture of iodine.

3. A packaging as defined in claim 1 wherein the halogen solution comprises an alcohol-base tincture of iodine.

4. A packaging as defined in claim 1 wherein a layer of a compatible adhesive is provided at least between the second and third lamina.

5. A packaging consisting essentially of, in combination, a halogen solution and a flexible generally fluid-impervious enclosure for retaining said solution and protecting the same from ambient environment, said enclosure being comprised of a relatively thin flexible and heat-sealable sheet, said sheet comprising a plurality of lamina adhered to each other along configurous surfaces thereof.

a first lamina being formed of a relatively thin aluminum foil having a protective coating on one surface thereof to provide vapor-impermeability and printability to said packaging, a second lamina strongly adhered to said first lamina along the exposed aluminum foil surface and bieng formed of polythylene terephthalate resin to provide structural strength to said packaging, a third lamina strong adhered to said second lamina and being formed of a vinylidene chloride copolymer resin to provide vapor-impermeability to said packaging, and a fourth lamina strongly adhered to said third lamina and being formed of a cast polyvinylchloride resin to provide chemical inertness and heat-sealability to said packaging, said enclosure surrounding said solution so that only a face portion of said fourth lamina contacts said solution and so that peripheral edge portions of said fourth lamina are heat-sealed to one another to form a generally fluid-impervious seal.

6. A packaging as defined in claim 5 wherein a compatible adhesive layer is provided at least between the first lamina and second lamina and between the third lamina and fourth lamina.

7. A packaging as defined in claim 5 wherein the protective coating on the aluminum foil is a cellophane.

8. A packaging as defined in claim 5 wherein the packaging coating on the aluminum foil is paper.

9. A packaging as defined in claim 5 wherein the halogen solution is comprised of a water-based tincture of iodine.

10. A packaging as defined in claim 5 wherein the halogen solution is comprised of an alcohol based tincture of iodine.

* * * * *